United States Patent
Yu et al.

(10) Patent No.: US 12,164,643 B2
(45) Date of Patent: Dec. 10, 2024

(54) VALIDATION AND RECOVERY OF OPERATING SYSTEM BOOT FILES DURING OS INSTALLATION AND RUNTIME FOR UEFI SECURE BOOT SYSTEMS

(71) Applicant: Dell Products L.P., Round Rock, TX (US)

(72) Inventors: Xinghai Yu, Beijing (CN); Colin Zou, San Jose, CA (US)

(73) Assignee: Dell Products L.P., Hopkinton, MA (US)

( * ) Notice: Subject to any disclaimer, the term of this patent is extended or adjusted under 35 U.S.C. 154(b) by 13 days.

(21) Appl. No.: 17/870,979

(22) Filed: Jul. 22, 2022

(65) Prior Publication Data
US 2024/0028736 A1 Jan. 25, 2024

(51) Int. Cl.
*G06F 21/57* (2013.01)
*G06F 9/4401* (2018.01)

(52) U.S. Cl.
CPC ............ *G06F 21/575* (2013.01); *G06F 9/441* (2013.01)

(58) Field of Classification Search
CPC ............................... G06F 21/575; G06F 9/441
See application file for complete search history.

(56) References Cited

U.S. PATENT DOCUMENTS

| | | | |
|---|---|---|---|
| 2005/0154898 A1* | 7/2005 | Chao | G06F 21/602 713/185 |
| 2008/0104381 A1* | 5/2008 | Peacock | G06F 21/30 713/1 |
| 2009/0193211 A1* | 7/2009 | Hu | G06F 21/575 711/E12.001 |
| 2013/0124841 A1* | 5/2013 | Huang | G06F 9/445 713/2 |
| 2013/0191622 A1* | 7/2013 | Sasaki | G06F 21/575 713/2 |
| 2014/0025941 A1* | 1/2014 | Bulusu | G06F 9/4401 713/2 |
| 2016/0232356 A1* | 8/2016 | Barkelew | G06F 9/4401 |
| 2021/0334123 A1* | 10/2021 | Lent | G06F 9/4411 |
| 2022/0138054 A1* | 5/2022 | Prasad | G06F 11/3006 707/679 |

FOREIGN PATENT DOCUMENTS

TW 200422834 A * 11/2004

* cited by examiner

*Primary Examiner* — Hyun Soo Kim
(74) *Attorney, Agent, or Firm* — Staniford Tomita LLP (57) ABSTRACT

Embodiments are described for a secure boot monitoring and validation process during operating system (OS) installation and runtime. A validated copy of OS boot files is made during OS installation. A checksum comparator or OS boot file filesystem check (FSCK) component validates the boot files upon initial installation of the OS. Any validation failure indicates corruption or unwanted modification of the boot file data, and an alert is sent. The file system is locked to prevent any exposure of user data. The validated copy is then used to recover the boot files. An OS boot file monitor component periodically monitors the boot files during OS run time and if any corruption is detected during a system boot after OS installation, the boot blocking, alert, and recovery procedures can be invoked.

16 Claims, 9 Drawing Sheets

VALIDATION AND RECOVERY OF OPERATING SYSTEM BOOT FILES DURING OS INSTALLATION AND RUNTIME FOR UEFI SECURE BOOT SYSTEMS

TECHNICAL FIELD

Embodiments are generally directed to networked-based data backup systems, and more specifically to automatically validating and recovering OS boot files during OS runtime.

BACKGROUND

Deduplication backup systems, such as the DellEMC Data Domain system use deduplication techniques as a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication.

A Data Domain system may have upwards of tens of thousands of backup storage appliances running in customer data centers. In commercial deployments, there can be significant numbers of service calls every year regarding as unbootable systems that need to be fixed. Quite a few system unbootable issues are caused by operating system (OS) boot file corruptions or invalidation. The OS boot files can be corrupted or invalidated during run time, reboots, power failures, or during DDOS upgrades, etc. Some of them are due to disk failure, file system corruption, software bugs or inappropriate manual actions. When a backup appliance encounters such a critical unbootable state, the customer has no choice but to make a support call to the system vendor.

Furthermore, current secure boot methods, such as Unified Extensible Firmware Interface (UEFI) secure boot, strictly check boot files in the BIOS stage to improve system security. Any slight corruption or modification of the OS boot files will prevent the system from booting. The UEFI secure boot introduces strict checks for OS boot files, but the OS usually does not have a corresponding validation and recovery mechanism to improve the reliability of the OS boot files. This can ultimately cause more unbootable problems in the field.

What is needed, therefore, is a generic OS boot file validation and recovery mechanism that works together with the UEFI secure boot to make the system more secure and robust at the same time.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the invention.

Some embodiments of the invention involve automated backup recovery techniques in a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments may be implemented in a large-scale deduplication backup network in which a backup server a backup management process to coordinate or manage the backup of data from one or more data sources to storage devices. The data generated or sourced by the system may be stored in any number of persistent storage locations and devices, such as local client storage, server storage, or network storage, which may at least be partially implemented through storage device arrays, such as RAID components. The storage devices may support various storage architectures such as storage area network (SAN), Network-attached Storage (NAS), or Direct-attached Storage (DAS) that make use of large-scale network accessible storage devices, such as large capacity disk (optical or magnetic) arrays.

In an embodiment, the system may be a Data Domain Restorer (DDR)-based deduplication storage system, and storage server may be implemented as a DDR Deduplication Storage server provided by DellEMC Corporation, though embodiments are not so limited and other similar backup and storage systems are also possible. In general, Data Domain is a purpose-built backup appliance providing streaming deduplication that is able to ingest data at full network speeds, from multiple backup sources while providing storage efficiency. File creation, processing, and deletion is controlled by the Data Domain File System (DDFS) which is represented as an active tier and a cloud tier with a policy engine that moves backup data to the cloud tier when it reaches a minimum data age as stipulated in a policy setup dialogue. Deletion of files in a DDFS file system is handled very differently from that of other common file systems, in that space used by a deleted file is not immediately available for re-use. This is because the DDR does not immediately know whether data which was referenced by the deleted file is also being de-duplicated against by other files and therefore whether it is safe to remove that data or not.

The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using the SHA1 algorithm.

DDFS represents a system that implements the modern Unified Extensible Firmware Interface (UEFI) that has replaced the traditional Basic Input/Output System (BIOS) interface protocol of earlier computers. Virtually all significant computer platforms, such as Linux computers, Microsoft OS computers, and so on have adopted UEFI, which defines the next generation firmware interface for personal computers. It is a standard that is managed through the UEFI forum, which is a collection of chipset, hardware, system, firmware, and OS vendors.

Traditional BIOS will generally boot any software (e.g., through a Windows boot loader or Linux GRUB boot loader) so that it is possible for malware, such as a rootkit, to replace a computer's boot loader. BIOS cannot differentiate between malware and a trusted boot loader, since it simply boots whatever boot code it finds. The UEFI platform includes a secure boot mechanism to stop this vulnerability. An OS vendor will include a certificate stored in UEFI, and the boot loader will be checked before launching to ensure that it is signed by the vendor. This prevents malware from hijacking the boot process. Secure boot defines how platform firmware manages security certificates, validation of firmware, and a definition of the interface (protocol) between firmware and the operating system. The user is thus protected from malicious code executing in the boot path by ensuring that only signed, certified "known good" code and boot loaders can execute before the operating system itself loads.

As used herein, the term 'boot' or 'boot up' means the process of starting a computer from power up, re-start, 'hard boot', GUI-based boot command, and so on. It can be hardware or software initiated and automatically starts a computer by accessing appropriate BIOS or BOOT software as the initial executed program.

Figure 1:
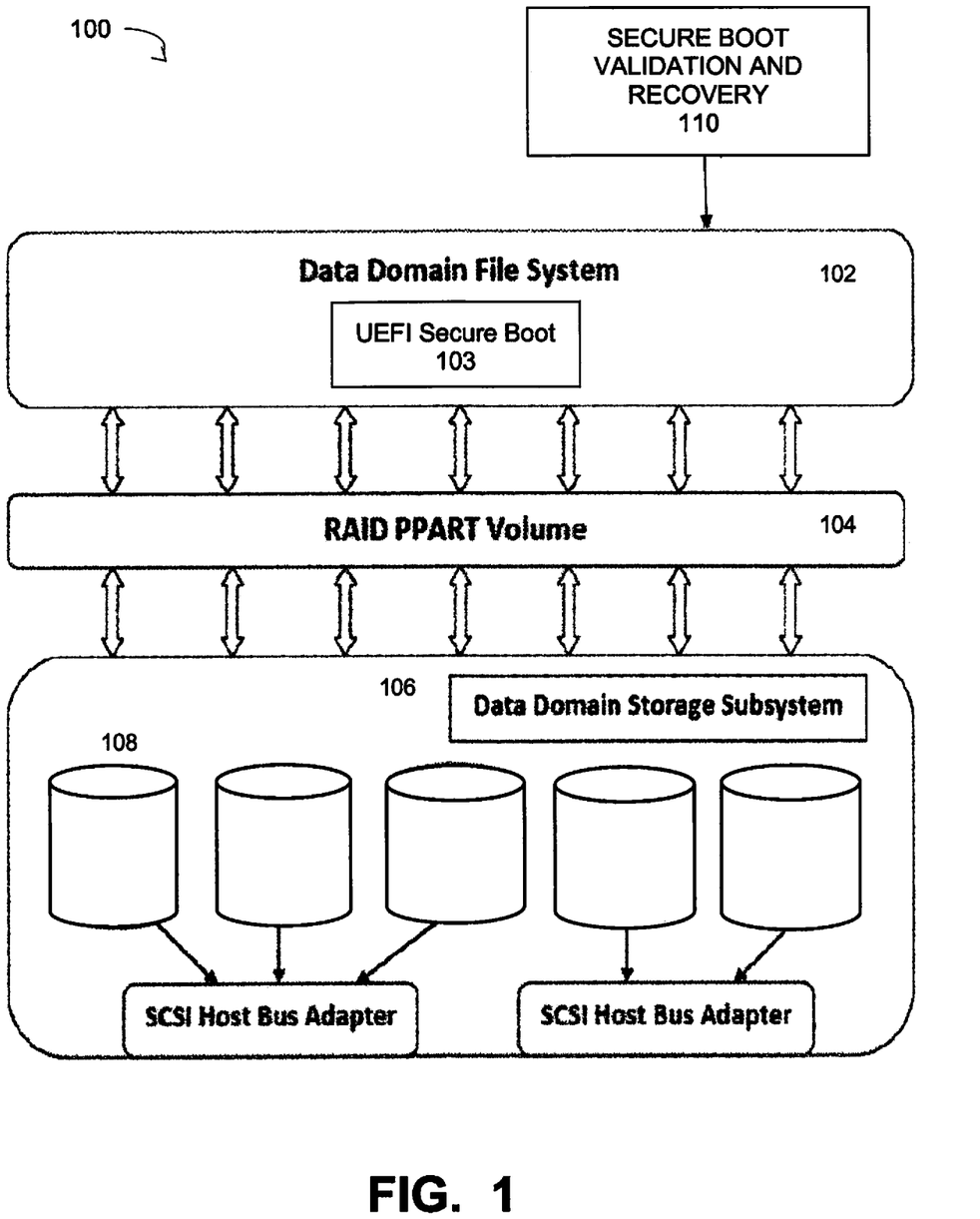
FIG. 1 illustrates a Data Domain system that is used to implement an operating system boot validation and recovery process, under some embodiments.

FIG. 1 illustrates a Data Domain system that is used to implement a UEFI secure boot monitoring and validation process, under some embodiments. As shown in FIG. 1, a Data Domain System 100 comprises a Data Domain File System 102 interacting with a RAID subsystem 104 and subsequently to a storage subsystem 106 having a number of storage devices, such as RAID array disks 108. Each of these disks could be connected to the same Host Bus Adapter (HBA) and would be sharing the bandwidth (SAS/SATA/iSCSI/FC) through which they access the physical device.

In an embodiment, the DDFS uses a UEFI secure boot process 103. As mentioned above, the UEFI secure boot is a technology used at UEFI BIOS stage that eliminates a major security void that may occur during a handoff between the UEFI firmware and UEFI operating system (OS). With UEFI secure boot, each component in the chain is validated and authorized against a specific certificate before it is allowed to load or run.

The UEFI secure boot process 103 introduces stricter checks for OS boot files, but present operating systems themselves, such as Linux, Windows, DDOS, etc., generally do not have a corresponding validation and recovery mechanism to improve the reliability of OS boot files, which is a situation that can ultimately cause more unbootable problems in the field.

Embodiments of system 200 include a secure boot validation and recovery process 110 that works together with the UEFI secure boot 103 to make the system more secure and robust by protecting against unexpected unbootable conditions and issues. Though described with respect to a Data Domain file and operating system, embodiments of the secure boot validation and recovery process 110 are not so limited, and can be applied to any kind of operating system that implements UEFI secure boot.

In present system, when UEFI secure boot is enabled, the OS boot files are strictly checked by cryptographic signature algorithms. Any minor changes to the boot file during the last OS run time will cause the UEFI secure boot check to fail, thus causing the system to become unbootable. Present systems thus have several significant disadvantages. First, there is no mechanism to validate the OS boot files during OS run time. The UEFI secure boot process will make the system unbootable when OS boot files are corrupted, but the user has no way of knowing this issue exists ahead of time until the UEFI secure boot fails the next system boot. Second, there is no timely alert or notification posted to the user when the OS boot files are corrupted or unexpectedly modified during OS run time. Third, there is no timely locking mechanism to protect user data when OS boot files are corrupted or unexpectedly modified during OS run time. Finally, there is no mechanism to automatically recover the OS boot files during OS run time.

In an embodiment, the recovery and validation process or processing component comprises certain elements including an OS Boot Files (OBF) monitor process and a Secure OS Boot Files copy (SOBF copy). The SOBF Copy is initially generated during OS installation and is updated during an OS upgrade operation. It is well protected by several mechanisms. The OBF monitor daemon starts when the OS boots and it will validate the OS boot files regularly by leveraging the SOBF copy. Once the monitor detects any unexpected boot file change, an alert will be posted, and recovery will be applied to fix the issue.

The OS boot files validation and recovery mechanism work together with the UEFI Secure Boot, support automatic OS boot files validation and recovery during OS run time to improve the system security and avoid unexpected unbootable issues at the same time. The new mechanism also guarantees the OS boot files in the SOBF copy are updated in time to match the running OS version before and after the OS upgrade. A new OBF monitor daemon is introduced to the appliance DDOS to support this mechanism.

Figure 2:
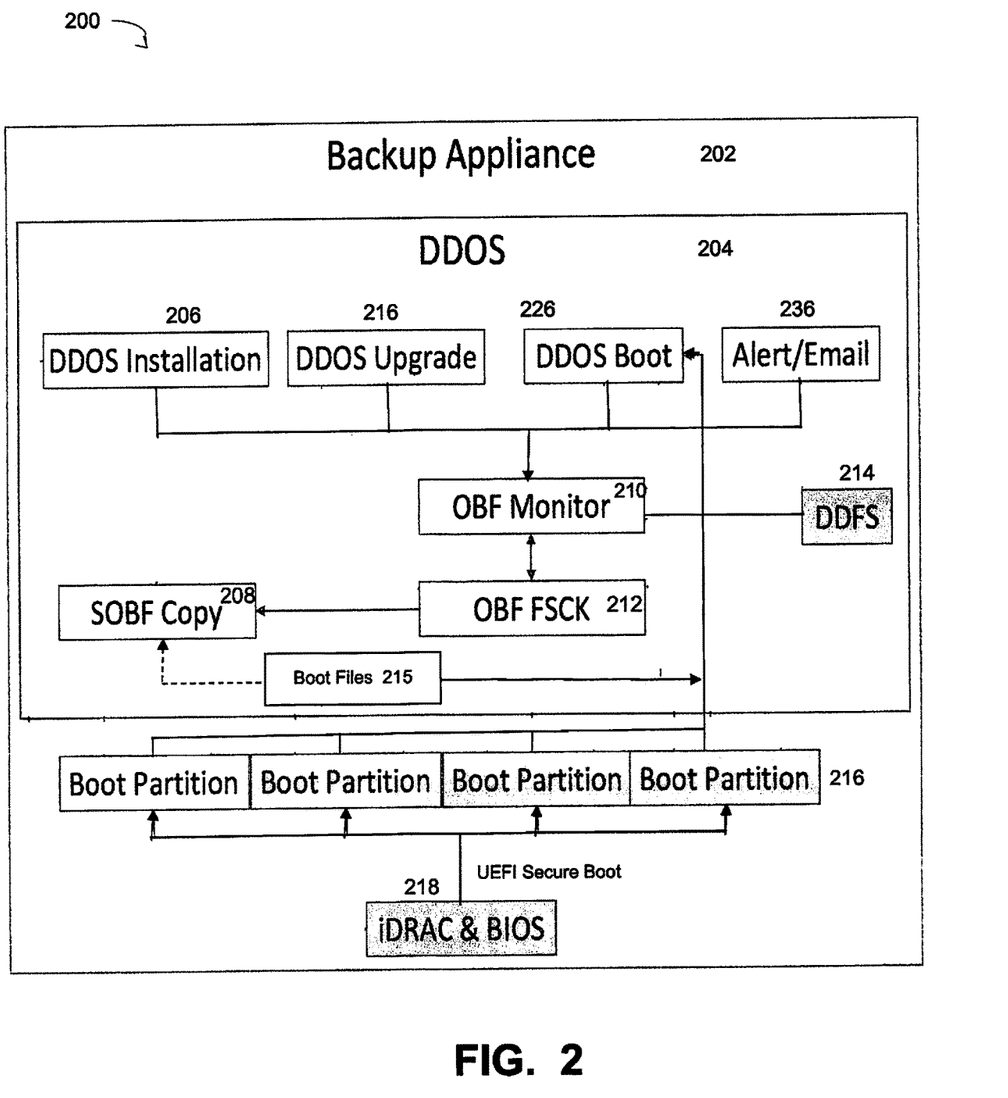
FIG. 2 illustrates a OS boot validation and recovery mechanism used in a computer executing an operating system using UEFI secure boot, under some embodiments.

FIG. 2 illustrates a OS boot validation and recovery mechanism used in a computer executing an operating system using UEFI secure boot, under some embodiments. As shown in FIG. 2, system 200 comprises a backup appliance (or other computing device) 202 executing an operating system, in this case, the Data Domain OS (DDOS) 204. It should be noted that other embodiments may be applied to other operating systems.

As shown in FIG. 2, within DDOS 204, the iDRAC/BIOS component 218 and DDOS boot files support the UEFI secure boot process. In an embodiment, the secure boot validation and recovery process (110) is facilitated by an OBF monitor component 210, which validates the DDOS boot files 215 on a regular (periodic) basis. The OBF monitor 210 works with the DDFS 214 and SOBF copy 208, which is a copy of DDOS boot files 215, as well as a OBF filesystem check (OBF FSCK) component 212, which checks the validity of the SOBF copy 208.

For the embodiment of FIG. 2, DDOS boot component 226 contains the OS boot software, which in this example has four copies, though any number is possible. Each copy locates a drive partition in a separate SSD or HDD drive. Upon system boot up, the OS boot software is loaded from the first boot partition and executed to performance the OS boot procedure. If it fails to load from the first partition, it will then next try the second, third, or fourth, and so on.

In an embodiment, the secure boot validation and recovery process 110 uses the OBF monitor in at least three distinct scenarios. The first is during an initial installation of the OS, such as in DDOS installation process 206, which is configured to enable the UEFI secure boot feature. In this case, the DDOS installation 206 initializes the SOBF copy 208 with installed DDOS boot files. The second is during an upgrade 216 of the OS from an old version to a newer version. In this case, the DDOS upgrade 216 supports to update the SOBF copy 208 with new version DDOS boot files. The third is in performing error handling through alerts 236 during runtime of the OS. In this case, the OBF monitor 210 posts alert or e-mail (or similar) message 236 when corruption or unexpected modification of the DDOS boot files 215 is detected. The alert notification process 236 for error handling can also be utilized for either or both of the OS installation 206 and upgrade 216 processes.

In an embodiment, the OBF monitor is configured to lock the DDFS 214 when DDOS boot files 215 are corrupted or unexpectedly modified to avoid data compromise, theft, or disclosure. The OBF monitor 210 is also configured to recover the DDOS boot files automatically.

Figure 3:
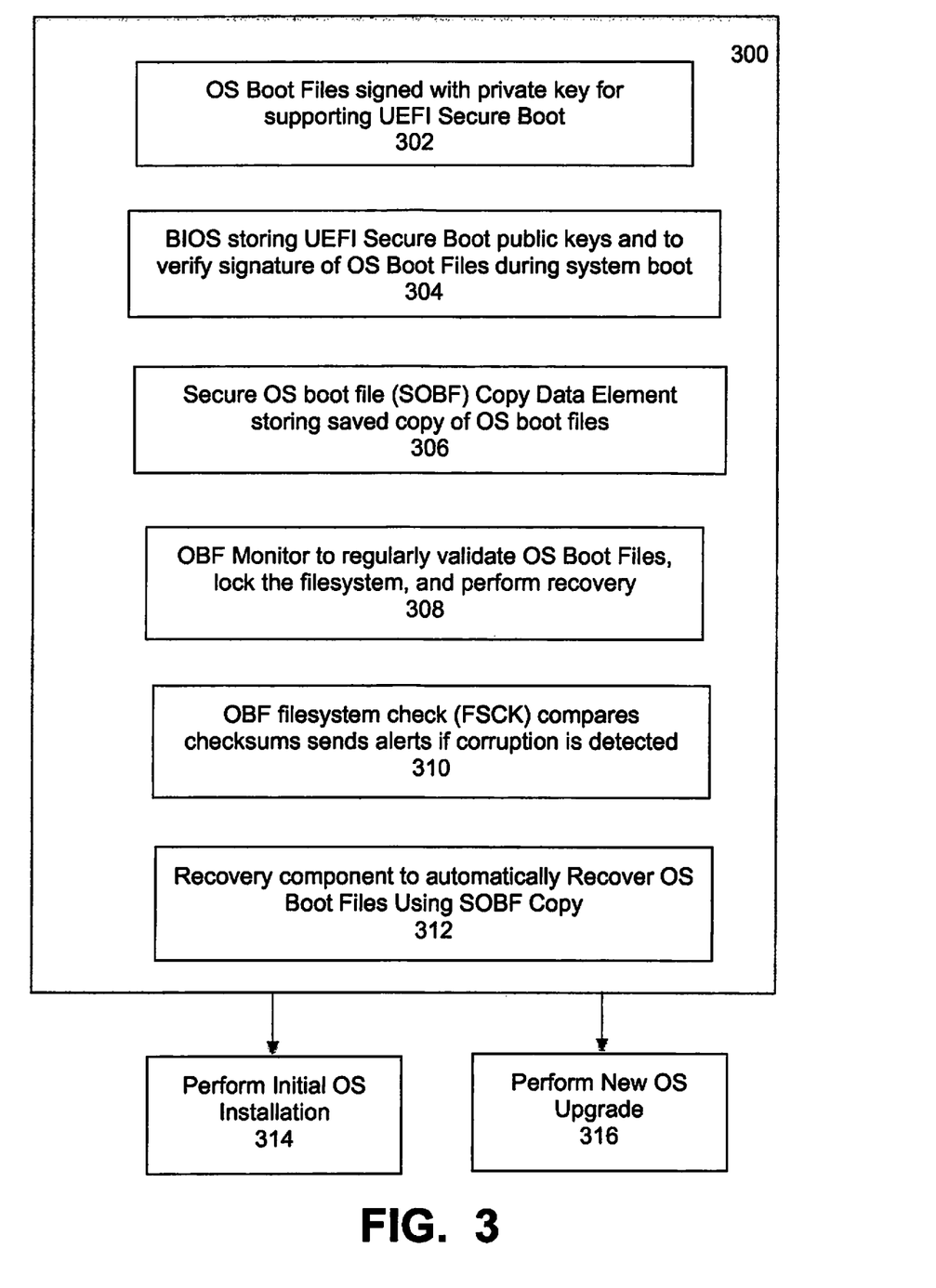
FIG. 3 is a diagram illustrating components performing a method of monitoring and validating UEFI secure boot operations, under some embodiments.

FIG. 3 is a diagram that illustrates certain functional components for monitoring and validating UEFI secure boot operations, under some embodiments. As shown in FIG. 3, system 300 includes OS boot files signed by a private key for supporting the UEFI secure boot, 302. It also includes a BIOS storing the UEFI secure boot public keys, and to verify the signature of the OS boot files with the public keys during system boot, 304. A Secure OS Boot Files copy (SOBF copy) data element 306 is introduced to save the copy of OS boot files. This SOBF copy is well protected by one or more known protection mechanisms. An OBF monitor 308 is then used to monitor and regularly validate the OS boot files. It is also configured to lock the file system and perform any recovery as needed in case of any detected boot file corruption. An OBF FSCK component 310 sends alert notifications if any data corruption is detected, and a recovery component of the OBF monitor automatically recovers the OS boot files using the SOBF copy, 312.

In an embodiment, the system uses the OBF monitor component during an initial OS installation procedure 314 or during an upgrade operation to a new OS, 316. For a new OS installation 314, during the appliance (e.g., DDR) installation, the process saves the SOBF copy and initializes the protection mechanism on the boot file copies. For an OS update process 316, the process updates the SOBF Copy during the OS upgrade operation itself.

During boot monitoring and validation, the OBF boot monitor 308 continuously and periodically checks the OS boot files for the UEFI secure boot process. In an embodiment, the monitor is implemented as a software daemon including a timer. The monitor reads the default period time value from a software registry (name-value pairs) database when it is started. When the timer is started, the monitor will invoke OBF FSCK 212 to check boot partitions 212 and the SOBF copy 208. When the OBF FSCK check is done, the monitor will re-read the registry database to refresh the period time value and update the timer. This way, the latest period time value can be applied for the next timer period and OBF FSCK check. The user can view and update the registry database via a command line interface or other GUI mechanism. The default period time value is 24 hours since a system typically generates a daily report for system health and the boot partition and SOBF copy health are part of the report. The system can be configured so that the user is able to update it to a shorter or longer value.

In an embodiment, the OBF monitor 308 checks the OS boot files using checksums (MD5 checksums) for each of the boot files that were generated before installation. The MD5 checksums and boot files are installed to boot partitions 216 and the SOBF copy 304 when the OS is installed during manufacture. Upon a boot, the OBF FSCK 212 will execute the MD5 program against each of the boot files and regenerate the MD5 checksums. If the newly generated MD5 checksum does not match the original factory checksum, then either the file or the MD5 checksum is corrupted. In most cases, the file is corrupted, but in either case, the boot is deemed corrupted or invalid, and an alert/recovery procedure needs to be performed.

Thus, if any discrepancy between the compared checksums is detected by the monitor and OBF FSCK 310, this indicates that a data attack or corruption issue of the boot files has been encountered. In this case, an alert notification component 236 automatically posts or sends an alert or message (e.g., e-mail, text, etc.). Thus, any corruption or unexpected modification of the OS boot files by as detected by the OBF monitor raises an alert to the user. In an embodiment, process 300 also includes a step to automatically recover the OS boot files when corruption or unexpected modification is detected by OBF monitor, 312. Details of this procedure will be provided with reference to FIG. 8 below.

In an embodiment, this is accomplished by retrieving the copy of the boot files from the SOBF copy 208. As stated above, when the MD5 checksum of boot files cannot be verified because the factory checksum does not match MD5 calculation results from the files, or the checksum and files cannot be read from the boot partition, then the files are considered corrupted and need to be recovered. The recovery operation includes multiple steps. 1. Re-check if the SOBF copy is corrupted or not by verifying the MD5 checksums in it. 2. If the SOBF copy is also corrupted (very rare), then stop and alert user; otherwise, copy the files in SOBF copy to the corrupted boot partition. 3. If the copy procedure fails, then stop and alert user; otherwise, the boot partition files are overwritten and check the newly copied MD5 checksum and files. 4. If MD5 check pass, then the recovery is done; otherwise, alert user.

As shown in FIG. 3, in an embodiment, the secure boot file monitoring and validation process is used in conjunction with an initial OS install operation, 310. This feature is enabled by certain BIOS settings in some systems, such as a DDOS system 204 to enable the UEFI secure boot and initialize the SOBF copy 208.

Table 1 below illustrates some BIOS settings of the UEFI secure boot, in an example embodiment. The DDOS installation will enable UEFI Secure Boot function and set the appropriate value, as shown in the table.

TABLE 1

| Section Setting | Values | Default Setting |
| --- | --- | --- |
| Secure Boot | Disabled or Enabled | Enabled |
| Secure Boot Policy | Standard or Custom | Standard |
| Secure Boot Mode | Deploy or User Mode | Deploy Mode |

Figure 4:
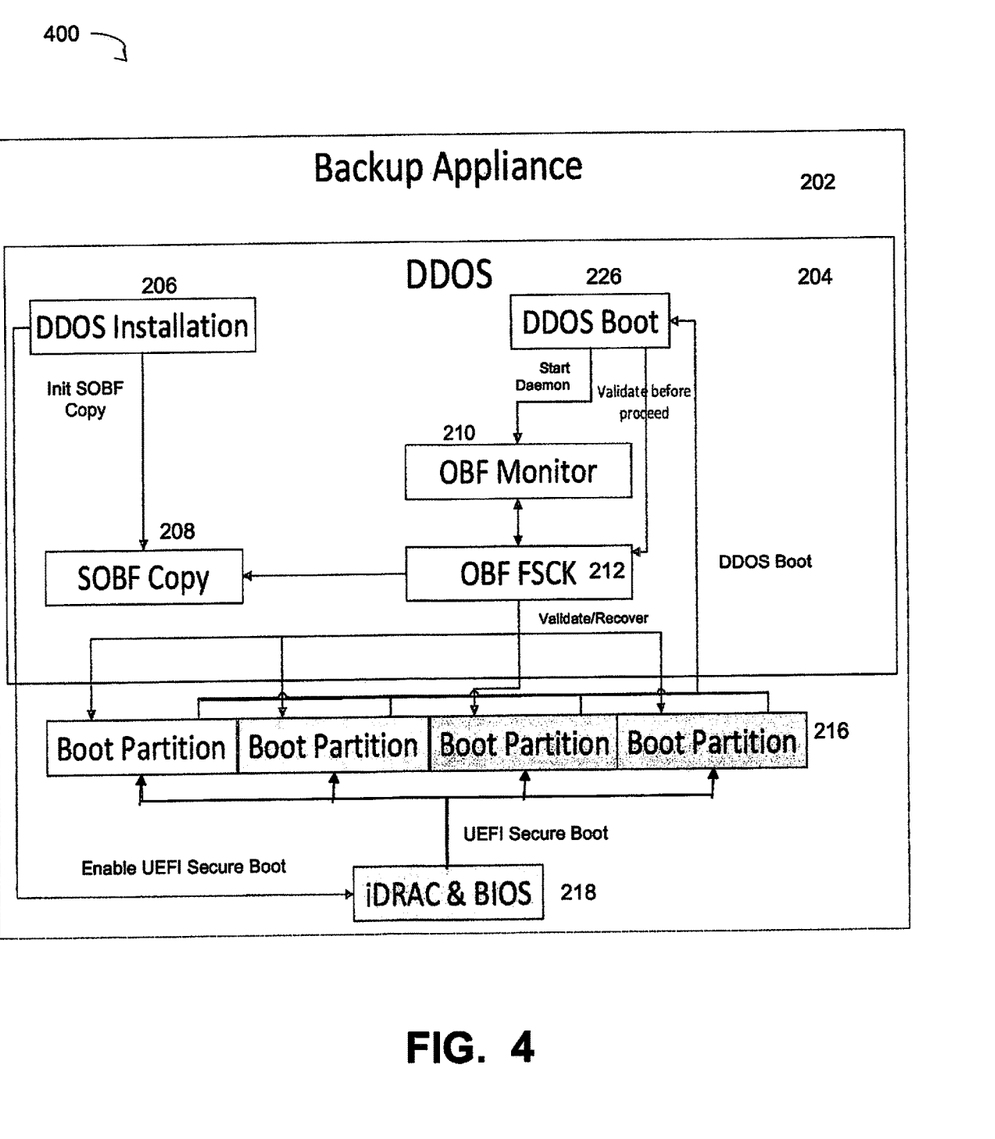
FIG. 4 illustrates the OS boot validation and recovery mechanism of FIG. 2 in the case of a OS installation, under some embodiments.

FIG. 4 illustrates the OS boot validation and recovery mechanism of FIG. 2 in the case of a DDOS installation procedure 206, under some embodiments. In this system 400, the DDOS installation processing component 206 is used in conjunction with the DDOS boot procedure 226, and the OBF monitor 210 and SOBF copy data element 208. The OBF FSCK component 212 is used to perform the validation and recovery operations. The OBF monitor 210 may be implemented as a daemon process initiated by the DDOS boot operation 226, though other similar implementations are also possible. The boot operation 226 is initiated by the system BIOS 218 triggering a UEFI secure boot through boot partitions 216. The UEFI secure boot is enabled by the DDOS installation step 206 itself.

With respect to the OBF monitor 210 operation during an initial OS installation, which is used to initially install DDOS to a backup appliance, the SOBF copy 208 is initially generated during this installation procedure with the DDOS boot files. The DDOS boot process 226 after installation starts the OBF monitor during booting of the system. The OBF monitor 210 validates the DDOS boot files regularly and provides supports to recover the DDOS boot files automatically if any corruption issues of the boot files are detected.

Figure 5:
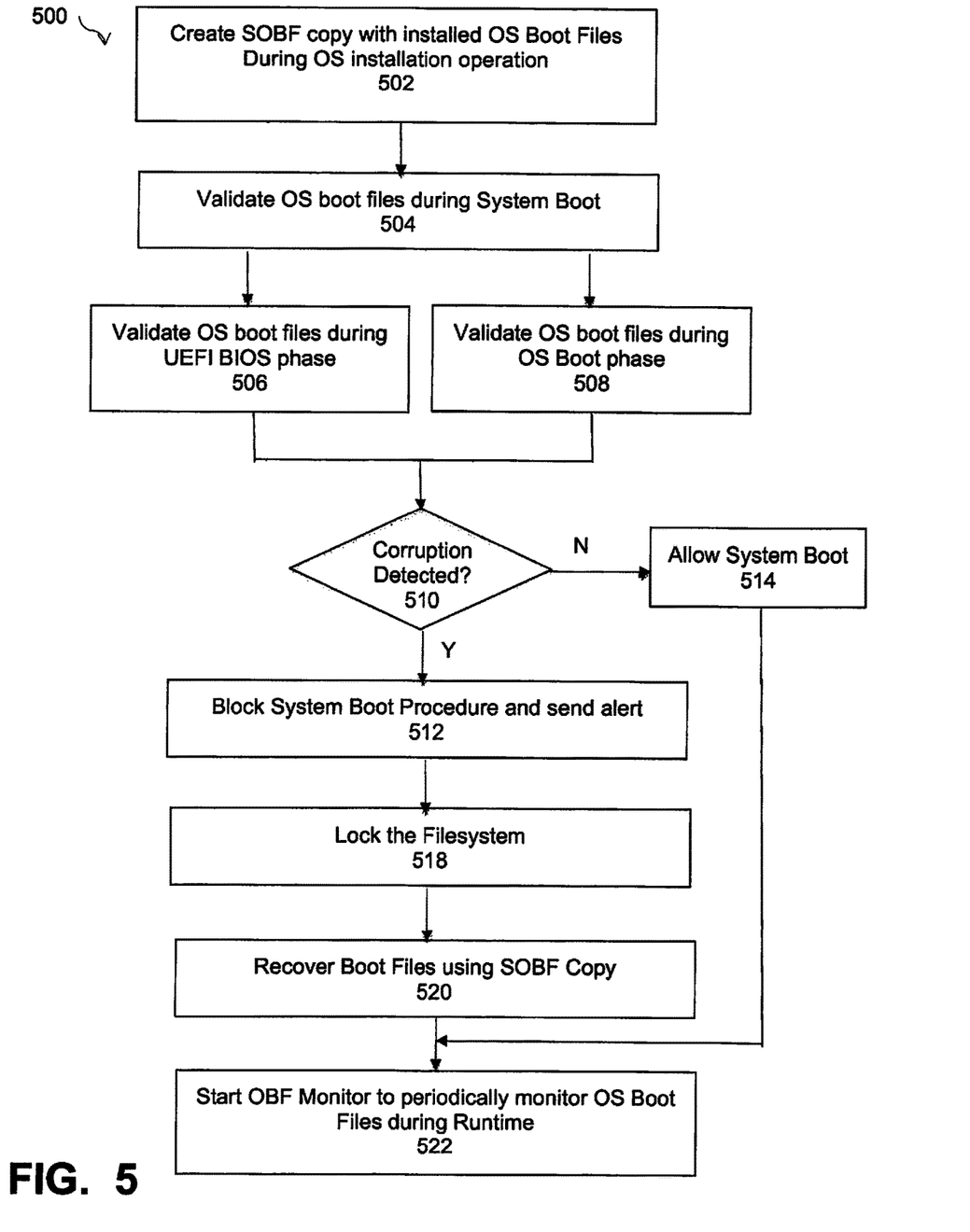
FIG. 5 is a flowchart that illustrates a process of monitoring and validating a UEFI secure boot during OS installation for the system of FIG. 4, under some embodiments.

FIG. 5 is a flowchart that illustrates a process of monitoring and validating a UEFI secure boot during OS installation for the system of FIG. 4, under some embodiments. As shown in FIG. 5, process 500 begins in step 502 with initializing the SOBF copy 208 with the installed DDOS boot files during the DDOS installation process 206. In an embodiment, the SOBF copy 208 consists of following elements: (1) a copy of the DDOS boot files, and (2) a manifest file containing the accepted file list and their checksum data (e.g., MD5 checksums). The SOBF copy 208 is protected by a file system attribute lock and a manifest file list and MD5 checksums. Other similar protection mechanisms for this copy file can also be used.

During a system boot 226, the system validates the OS boot files, 504. This validation can be performed during the UEFI BIOS phase 506 by verifying the file signatures. For this process, the files are signed with a private key when building the OS, the UEFI BIOS verifies the signatures using the corresponding public key, which is pre-installed in the BIOS database at the factory. It can also be done during the OS boot phase by using the OBF FSCK component 212, as shown in step 508. If no issues are detected in decision block 510, the system boot is allowed to proceed, 514.

If any corrupted or modified OS boot files or file components are detected in 510, the system can block the system boot procedure, 512. It can then send an alert notification to inform and warn the user of the boot file corruption or modification issue. Once any corruption or unexpected modification of OS boot files is detected 510, the system locks the filesystem (e.g., DDFS) to avoid data destruction, modification or unwanted disclosure or exposure of the boot file data, 518. The OS boot files can then be recovered immediately by the OBF monitor 210 by using the SOBF copy 208, step 520.

In an embodiment, the OBF monitor is used to validate the OS boot files during OS run time after the OS is initially installed. Thus, as shown in step 522, an OBF monitor daemon will be started during DDOS boot up 226 and this monitor will validate the OS boot files regularly once the installed OS is used. The OBF monitor 210 can detect any OS boot file corruption or unexpected modification by leveraging the SOBF copy 208 as the standard set of boot file data.

Figure 6:
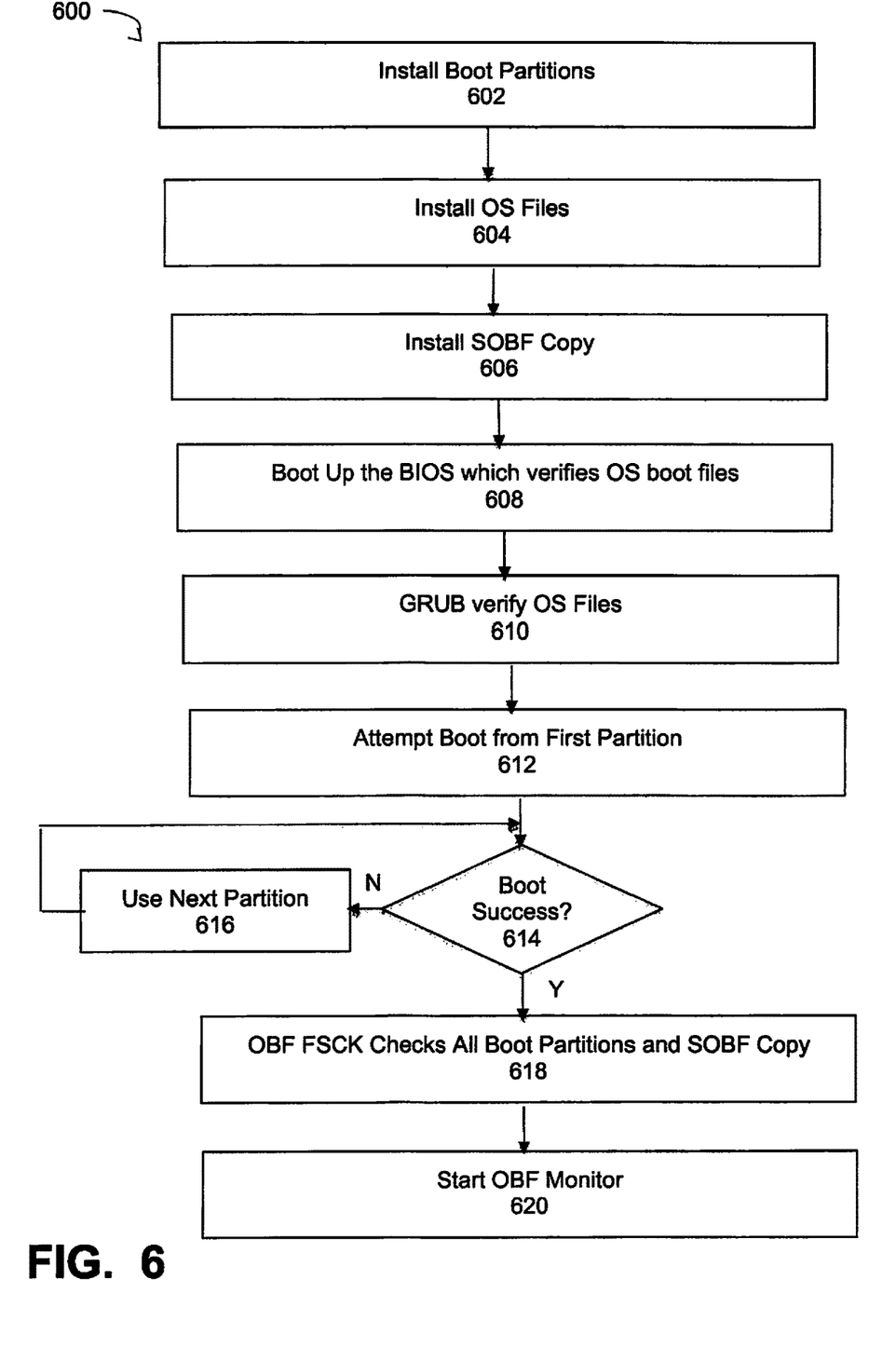
FIG. 6 is a flowchart that illustrates a workflow for performing OS installation and boot up using SOBF copy and OBF FSCK components, under some embodiments.

As described above, the OS installation process 206 and OS boot process 226 use the SOBF copy 208 and OBF FSCK 212 components. FIG. 6 is a flowchart that illustrates a workflow for performing OS installation and boot up using SOBF copy and OBF FSCK components, under some embodiments. As shown in FIG. 6, process 600 starts by installing boot partitions 216 (e.g., boot partitions #1, #2, #3 and #4) as a first step in the initial OS install process, 602. The process next install the OS files to another OS (disk) partition 216, step 604, and it installs the SOBF copy 208, step 606. The system then boots up the BIOS 218, step 608. The BIOS firmware verifies the OS boot files as a security check. The system grub verifies the OS files, 610. For this step, OS files are signed by a private key when OS is built, and the Linux GRUB (Grand Unified Bootloader) command (or similar) verifies OS file signatures using a corresponding public key that is installed together with boot files.

The OS boot then attempts to boot the system from the first boot partition (e.g., partition #1), 612. If, in step 614, the system then manually iteratively selects the next partition (e.g., partitions #2, #3, #4), until the boot is successful.

The OBF FSCK component 212 then checks all boot partitions, and the SOBF copy through the MD5 checksum verify procedure discussed above. After this, the system start the OBF monitor 210, such as through a daemon process initiated by an OS boot procedure.

As described above, the OBF monitor 210 and OBF FSCK 212 continuously monitor and validate both the initial OS installation as well as subsequent OS boot 226 operations to detect any corruption of the boot files that may compromise the integrity of the system data. In an embodiment, an error handling process using a system of alert notifications 236 is used to inform and warn the user of any such corruption issues.

Figure 7:
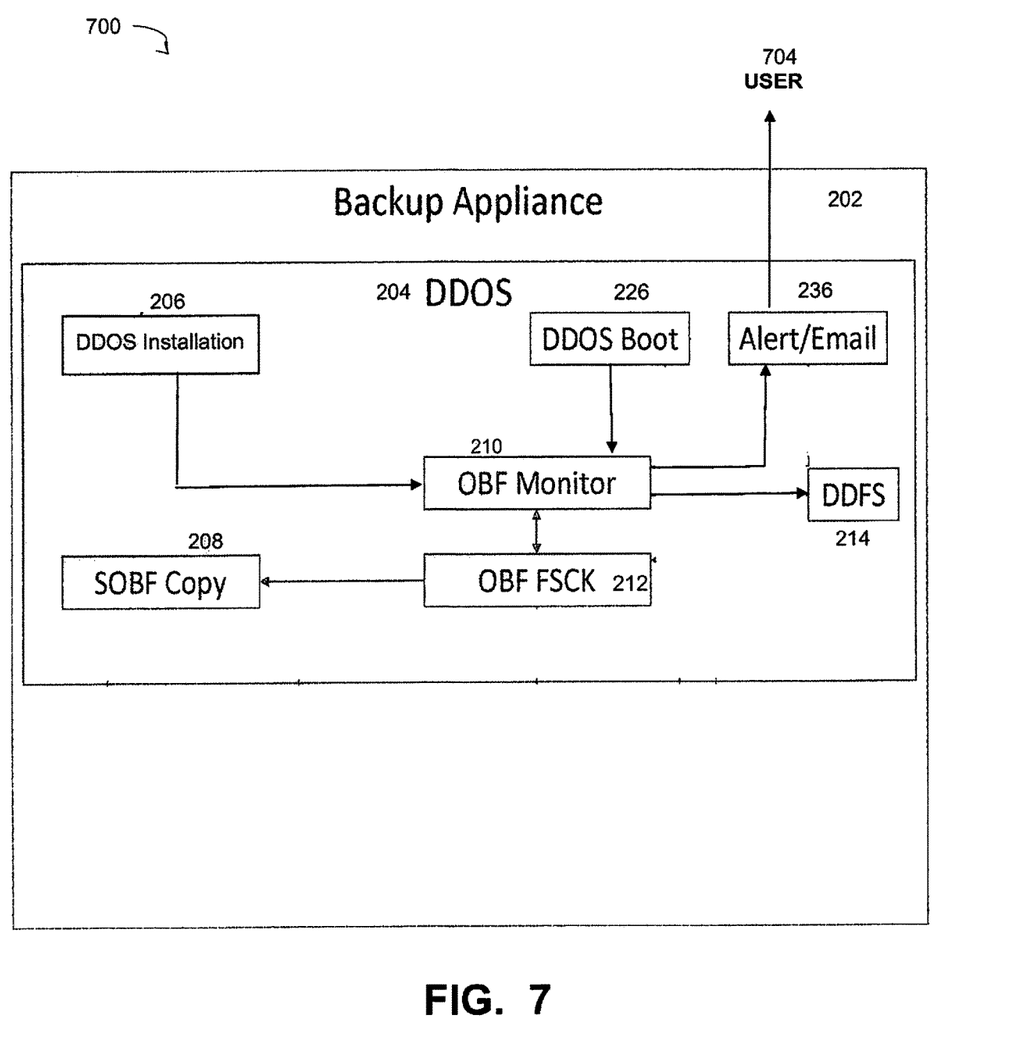
FIG. 7 illustrates an alert and notification mechanism for use in a DDOS installation procedure, under some embodiments.

FIG. 7 illustrates an alert and notification mechanism for use in a DDOS installation procedure, under some embodiments. FIG. 7 illustrates an error handling process generating alert notifications in the event of boot file corruption, under some embodiments. With respect to system 700, the OS boot operation 226 starts the OBF monitor 210 during booting. The OBF monitor 210 validates the OS boot files regularly per the defined monitoring period using the OBF FSCK component 212. In the event of any detected issue with the boot files, the OBF monitor sends or posts an alert notification to the user 704. The OBF monitor 210 also disables the filesystem 214 when DDOS boot files corruption or unexpected modification is detected to avoid data corruption or disclosure. The OBF monitor 210 can also initiate recovery of the boot files automatically using the SOBF copy 208.

The error handling feature using alert notifications can be performed during regular DDOS boot operations as well as for the initial validation of the boot files upon initial OS installation 206 of the operating system. After the initial OS installation procedure installs boot files and SOBF copy files, the installation program continues to install OS files including OBF monitor and OBF FSCK. After installation, a system reboot and OBF FSCK is invoked to check boot files and SOBF copy files by MD5 checksums. If there is a file corruption found in boot partitions, then OBF FSCK further check files in SOBF copy. If the SOBF copy is fine, then the system copies the files to overwrite the corrupted files, otherwise, it stops and alerts user through the auto alert 236, such as sending an e-mail message, or similar. Thus, the initial OS installation procedure invokes a re-boot that triggers the overall validation and error recovery process.

Figure 8:
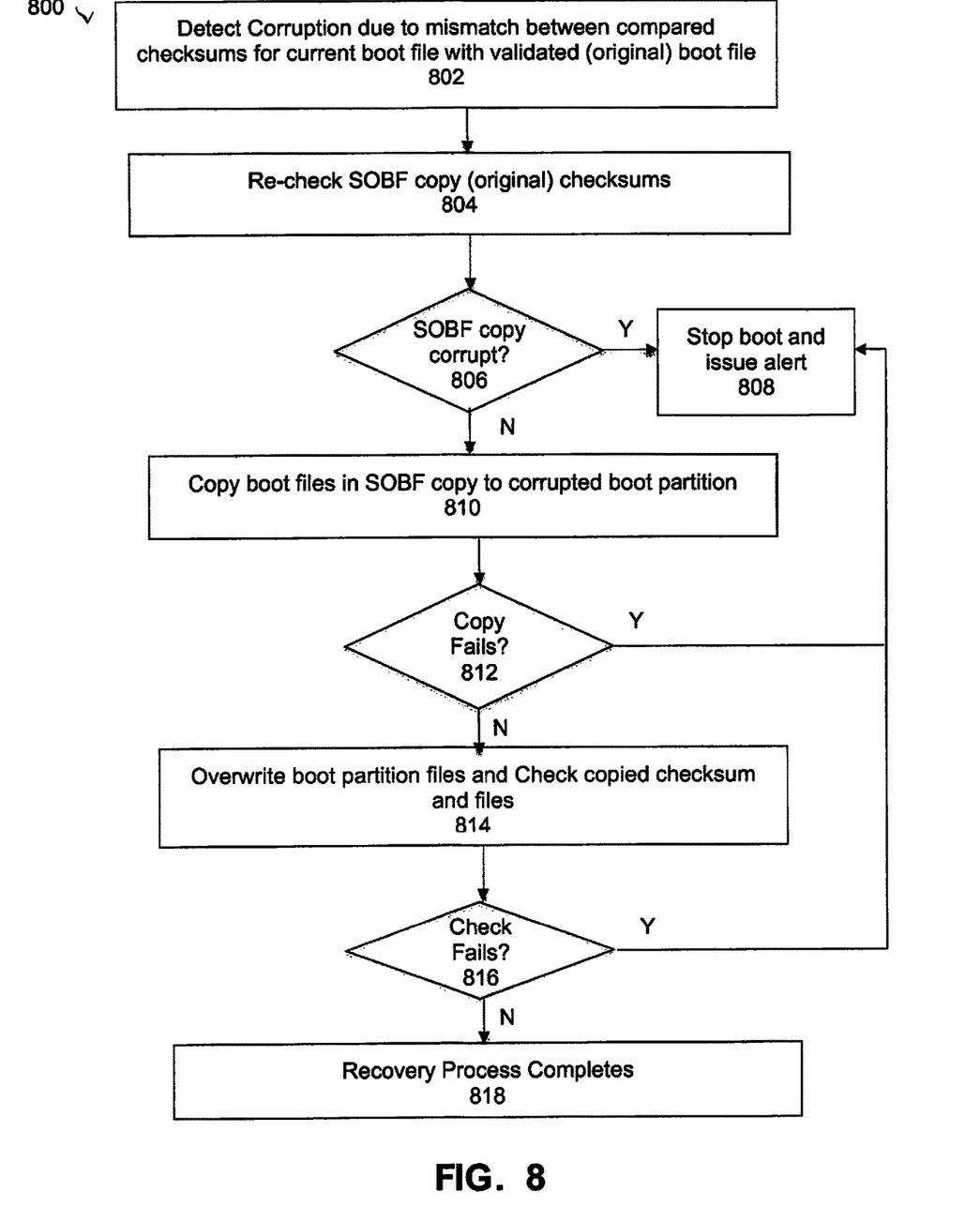
FIG. 8 is a flowchart that illustrates a method of performing a boot file recovery, under some embodiments.

As stated above and with reference to FIG. 3, if any discrepancy between the compared checksums is detected by the OBF monitor 308 and OBF FSCK 310, a corruption or issue of the boot files has been encountered. Embodiments include a process to automatically recover the OS boot files using the SOBF copy 306 when such corruption is detected. FIG. 8 is a flowchart that illustrates a method of performing a boot file recovery, under some embodiments. Process 800 starts with detection of corruption due to mismatched boot file checksums between a current boot file and the validated boot file for the initial OS installation and as stored in the SOBF copy, 802. The process re-checks if the SOBF copy is itself corrupted or not by verifying the MD5 checksums in the copy, 804. If, in step 806 it is determined that the SOBF copy is itself corrupt (rare), the boot process is stopped and a user alert issues, 808. Otherwise, the process copies the boot files in SOBF copy to the corrupted boot partition, 810. If this copy procedure fails as determined in comparison block 812, then the process stops and the user is alerted, 808. If the copy operation succeeds, the boot partition files are overwritten and the system checks the newly copied MD5 checksum and files, 816. If this check passes, 816, then the recovery process completes, 818, but if it fails, the user is alerted, 808.

Embodiments of the secure boot validation and recovery process 110 described herein provide several advantages including: immediate detection of OS boot file corruption or modification during OS run time, posting of alerts warning the user of the possibility or occurrence of a boot issue, and immediate protection of user data by locking the filesystem when any OS boot file corruption is detected during OS run time or during OS installation. This process also allows for recovery of the OS boot files during OS run time through a validated copy of the boot files created upon OS installation.

Embodiments of the processes and techniques described above can be implemented on any appropriate backup system operating environment or file system, or network server system. Such embodiments may include other or alternative data structures or definitions as needed or appropriate.

Figure 9:
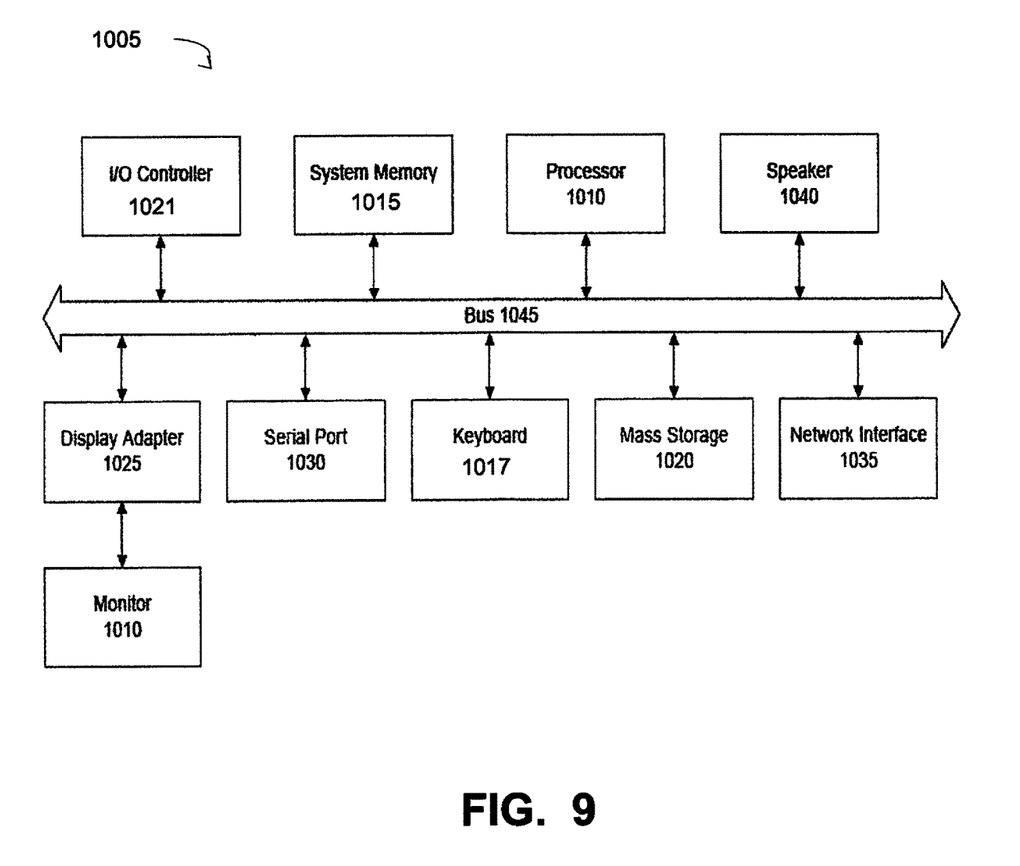
FIG. 9 is a system block diagram of a computer system used to execute one or more software components of the network of FIG. 1, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system).

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 11 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for validating operating system (OS) boot files in a secure boot system comprising a Unified Extensible Firmware Interface (UEFI) secure boot system, the method comprising:
   copying an OS boot file from an original operating system boot file having the OS boot files during an initial installation of the operating system in the system to create a validated copy of the OS boot file;
   incorporating in the validated copy of the OS boot file, a manifest file listing accepted files with associated checksum data, and an attribute lock to provide protection for the validated copy;
   first validating the OS boot files during a system boot by first comparing boot files with the validated copy;
   subsequently validating, in a OS boot file monitor upon each system boot up, the OS boot files by subsequently comparing the boot files with the validated copy;
   detecting, if either of the first comparing or subsequently comparing steps yields a mismatch between compared boot files, a boot file corruption;
   blocking a current boot operation using the corrupted boot file; and
   sending an alert to a user notifying the user of the boot file corruption, wherein the UEFI secure boot system comprises part of a deduplication backup system.

2. The method of claim 1 further comprising locking a file system of the secure boot system to prevent unwanted disclosure of boot file data.

3. The method of claim 2 further comprising recovering the corrupted boot file by loading the copy of the OS boot file for a recovery boot procedure.

4. The method of claim 1 wherein the alert is sent by one of: e-mail message, text message, or phone call to the user.

5. The method of claim 1 wherein the validation comprises comparing checksums of boot file components between original boot checksums encoded during initial OS manufacture and boot files of the current boot operation.

6. The method of claim 5 wherein the first validating comprises validating the OS boot file during an UEFI BIOS phase, and wherein the second validating comprises validating the OS boot file during an OS boot phase.

7. The method of claim 1 wherein the deduplication backup system comprises a Data Domain (DD) system utilizing a DD operating system and DD file system, and wherein the boot file is used to boot one or more DD appliances.

8. A method of validating operating system (OS) boot files in a deduplication backup system using a secure boot mechanism, comprising:
- initially installing an OS in a backup appliance of the system;
- copying, during the OS installing, an OS boot file from an original operating system boot file having the OS boot files to a secure OS boot file (SOBF) data element to create a validated copy of the OS boot file as an SOBF copy;
- incorporating in the validated copy of the OS boot file, a manifest file listing accepted files with associated checksum data, and an attribute lock to provide protection for the validated copy;
- attempting to boot the backup appliance using the OS boot file in a current boot operation;
- starting, during the current boot operation, an OBF boot monitor process to periodically validate boot files by comparing a current boot file with the SOBF copy;
- indicating, if a currently compared boot file does not match, the current boot file to be corrupt; and
- blocking a current boot operation using the corrupt current boot file from executing, wherein the deduplication backup system comprises a Data Domain (DD) system utilizing a DD operating system and DD file system, and wherein the boot file is used to boot one or more DD appliances.

9. The method of claim 8 further comprising locking a file system of the secure boot system to prevent unwanted disclosure of boot file data.

10. The method of claim 9 further comprising recovering the corrupted boot file by loading the copy of the SOBF copy for a recovery boot procedure.

11. The method of claim 9 further comprising installing a plurality of boot partitions in the system, each boot partition functionally coupled to a BIOS of the system.

12. The method of claim 11 further comprising:
- attempting the current boot operation from a first boot partition; and
- re-attempting, upon failure of an attempted boot operation, the current boot operation from one or more successive following boot partitions of the plurality of boot partitions.

13. The method of claim 8 further comprising:
- signing the OS boot file for a current boot operation with a private key supporting the UEFI secure boot mechanism; and
- verifying, during the current boot operation, a signature of the OS boot file with a public key.

14. A system configured to validate operating system (OS) boot files in a secure boot system, comprising:
- an OS boot file data element copying an OS boot file from an original operating system boot file having the OS boot files during an initial installation of the operating system in the system to create a validated copy of the OS boot file, and incorporating in the validated copy of the OS boot file, a manifest file listing accepted files with associated checksum data, and an attribute lock to provide protection for the validated copy;
- an OS file system check component first validating OS boot files during a system boot by first comparing the OS boot files with the validated copy; and
- an OS boot file (OBF) monitor component periodically checking boot operations and subsequently validating, upon each system boot up, the OS boot files by subsequently comparing the boot files with the validated copy, the OBF monitor further detecting, if either of the first comparing or subsequently comparing steps yields a mismatch between compared boot files, a boot file corruption, and blocking a current boot operation using the corrupted boot file, and sending an alert to a user notifying the user of the boot file corruption, wherein the secure boot system comprises a Unified Extensible Firmware Interface (UEFI) secure boot system, and wherein the deduplication backup system comprises a Data Domain (DD) system utilizing a DD operating system and DD file system, and wherein the boot file is used to boot one or more DD appliances.

15. The system of claim 14, wherein the validation comprises comparing checksums of boot file components between the validated copy and boot files of the current boot operation, and further wherein the first validating comprises validating the OS boot file during an UEFI BIOS phase, and yet further wherein the second validating comprises validating the OS boot file during an OS boot phase.

16. The system of claim 15 wherein the OBF monitor further locks a file system of the secure boot system to prevent unwanted disclosure of the boot file data and recovers the corrupted boot file by loading the copy of the OS boot file for a recovery boot procedure.

* * * * *